United States Patent
Schmid et al.

(10) Patent No.: US 7,165,456 B2
(45) Date of Patent: Jan. 23, 2007

(54) MEASURING METHOD TO DETERMINE THE NOISE EMISSION OF AN ELECTRIC MOTOR AND MEASURING DEVICE

(75) Inventors: Guido Schmid, Triberg (DE); Eduard Hudec, Villingen-Schwenningen (DE); Hubert Hauser, Balgheim (DE)

(73) Assignee: Minebea Co., Ltd., Miyota-machi (JP)

( * ) Notice: Subject to any disclaimer, the term of this patent is extended or adjusted under 35 U.S.C. 154(b) by 165 days.

(21) Appl. No.: 10/976,700

(22) Filed: Oct. 29, 2004

(65) Prior Publication Data

US 2005/0092090 A1    May 5, 2005

(30) Foreign Application Priority Data

Nov. 5, 2003    (DE)    ................. 103 51 698

(51) Int. Cl.
*G01H 9/00*    (2006.01)
*G01M 7/02*    (2006.01)

(52) U.S. Cl. .......................... 73/657; 73/660

(58) Field of Classification Search .............. 73/660, 73/657, 646
See application file for complete search history.

(56) References Cited

U.S. PATENT DOCUMENTS 3,913,084 A * 10/1975 Bollinger et al. ............. 73/660
5,883,715 A    3/1999 Steinlechner et al.
5,886,264 A * 3/1999 Hu et al. ....................... 73/646
6,892,568 B1 * 5/2005 Witer et al. ................... 73/116

FOREIGN PATENT DOCUMENTS

| DE | 195 22 272 | 1/1997 |
| DE | 198 28 498 | 1/2000 |
| DE | 101 00 467 | 7/2001 |
| WO | 01/14825   | 3/2001 |

OTHER PUBLICATIONS

Hofer et al., "Die Akustik des neuen V6-TDI-Motors im Audi A8", ATZ Automobiltechnische Zeitschrift 99, 1997, pp. 414-423.
Castellini et al., "Automotive Components Vibration Measurements by Tracking Laser Doppler Vibrometry: Advances in Signal Processing", Measurement Science and Technology 13 (2002), pp. 1266-1278.
Beeck et al., "Laser Metrology—A Diagnostic Tool in Automotive Development Processes", Optics and Lasers in Engineering 34 (2000), pp. 101-120.

* cited by examiner

*Primary Examiner*—John E. Chapman
(74) *Attorney, Agent, or Firm*—Lipsitz & McAllister, LLC

(57) ABSTRACT

A measuring method to determine the noise emission of an electric motor is proposed in which the vibrational excitation of the running electric motor is measured by a laser vibrometer device and this measured vibrational excitation is correlated with a noise level.

18 Claims, 4 Drawing Sheets

MEASURING METHOD TO DETERMINE THE NOISE EMISSION OF AN ELECTRIC MOTOR AND MEASURING DEVICE

The present disclosure relates to the subject matter disclosed in German application No. 103 51 698.0 of Nov. 5, 2003, which is incorporated herein by reference in its entirety and for all purposes.

BACKGROUND OF THE INVENTION

The invention relates to a measuring method to determine the noise emission of an electric motor.

The invention relates further to a device to measure the noise level of an electric motor which can be used in particular to carry out the method according to the invention.

It is known to measure the noise emission produced by electric motors in a sound chamber that is soundproofed against surrounding influences. Measuring sound pressure in the sound chamber involves high costs and is also very time consuming.

SUMMARY OF THE INVENTION

In accordance with the invention, a measuring method to determine the noise emission of an electric motor is provided which allows the sound pressure to be ascertained in a simple and precise manner.

In accordance with the invention, vibrational excitation of an electric motor is measured by a laser vibrometer device while the electric motor is running, and the measured vibrational excitation is correlated with a noise level.

The laser beam that is applied to the electric motor to be tested does not influence the resonance characteristics of the electric motor. This allows the vibrational excitation to be measured with high reproducibility which in turn allows good correlation with the noise level, i.e. the sound pressure, to be achieved. In particular, there is no need to clamp the test electric motor so that the vibrational behavior of the test electric motor is only slightly influenced by the test electric motor being supported in the respective measuring device.

The test electric motor can be easily positioned with respect to the laser vibrometer device. The vibration amplitudes of the test electric motor measured by means of the laser vibrometer device can be analyzed and the noise level can be determined using correlation parameters. Here, it is possible to perform this correlation either for an overall noise level or for individual frequency components in the sound frequency spectrum of the test electric motor.

The test electric motor can be systematically scanned by means of the laser beam produced by the laser vibrometer device. In particular, the vibrational excitation can be measured at that point or at those points where there is a good correlation to the sound level.

A laser vibrometer device ascertains the vibration amplitude of a measured object based on the Doppler effect which results in a frequency shift between the laser light which is applied to the measured object and the laser light which is reflected by the measured object. A laser vibrometer device is described, for example, in DE 195 22 272 A1.

It is thus possible to measure the noise emission produced by electric motors in particular in a non-time consuming way, allowing exact results with high reproducibility to be obtained.

In particular, the vibrational excitation produced at the electric motor's nominal speed is measured, making it possible to establish a comparison with a specification.

It is particularly advantageous if the vibrational excitation is measured at one or more defined points on the electric motor. It has been demonstrated on a large number of different types of electric motors that a single measuring point is sufficient to enable the noise level to be determined using the vibrational excitation, the vibration amplitudes in turn being measured by means of the laser vibrometer device. Since only this defined measuring point need now be scanned by the laser beam, the noise emission of the test electric motor can be speedily measured.

It is favorable if the vibrational excitation is measured at one or more measuring points on the electric motor at which a vibration antinode can be formed. Here, the vibration antinode can either be an absolute amplitude maximum or a relative maximum. This measuring point is then representative for the correlation with the sound pressure, i.e. there is high correlation.

Provision can be made for the test electric motor or one or preferably more identically constructed electric motors, to be scanned in order to determine the measuring point or measuring points. It is possible to determine a vibration antinode in particular by this kind of scanning. When several identically constructed electric motors are scanned, one or more measuring points can be determined with good statistical reliability.

Here, provision can be made for a surface of the electric motor(s) to be divided into a grid and the vibrational excitation to be determined by the laser vibrometer device at grid sites. This makes it possible to search systematically for a measuring point or measuring points.

It is particularly advantageous if the measuring point or measuring points is/are determined such that there is a high correlation to the noise level. In particular, identically constructed electric motors are used that have a known noise level which has been previously ascertained, for example, in a sound chamber. These electric motors are then scanned and the correlation parameters to the noise level are determined. A search is then made for that point or those points which show the highest correlation. These points in turn then define the measuring point or the measuring points. These points are then established accordingly and the test electric motor and the laser vibrometer device are positioned with respect to each other in such a way that during testing the laser beam is aimed directly at the defined measuring point.

It can be provided that the measuring point or the measuring points is/are determined in the course of an octave analysis of the vibrational excitation. The frequency spectrum is determined, for example, and from this frequency spectrum only the higher octave components, such as the third octave components or higher, are used in determining the measuring point or measuring points. This makes it possible to exclude low-frequency components, which can be attributed, for example, to imbalance or switching noise, when the measuring point or measuring points is/are determined.

It is particularly advantageous if in order to determine the correlation parameters between the vibrational excitation and the noise level, the vibrational excitation for a series of identically constructed electric motors having a known noise level is determined. If a sufficiently large number of identically constructed electric motors has been chosen, high statistical reliability can be achieved in determining the correlation parameters. This in turn enables the sound pressure to be ascertained with high reproducibility once the vibration amplitude has been determined.

The electric motors are particularly chosen in such a way that their noise level lies within a specific noise level range.

This noise level range preferably comprises the range of at least twice the standard deviation. It has been proven in practice to be advantageous if this range is a four sigma range, i.e. comprises four times the standard deviation. Since then an insufficient choice of different sound pressures is available, there should also be an appropriate value range for vibration amplitudes. This in turn makes it possible to determine correlation parameters and, in particular, a correlation line (regression line) with high correlation.

In particular, in the course of determining this correlation on identically constructed electric motors with known noise levels, a measuring point or several defined measuring points is/are also determined at which the test electric motors are then measured.

It is particularly advantageous if a frequency spectrum of the vibrational excitation is determined, which can be carried out, for example, using fast Fourier transformation of the data supplied by the laser vibrometer device. Here, the frequency spectrum is a spectrum of the vibration frequencies of the electric motor which is operated in particular at its nominal speed. A check can then also be made to determine whether the amplitudes at individual frequencies lie below a frequency-dependent threshold value.

In particular, the frequency spectrum is determined up to a minimum of 20 kHz in order to thus obtain a good overview.

An overall sound pressure can basically be determined as a well as a frequency-dependent sound pressure. A check can again be made to see if the overall sound pressure is below or above the threshold value and it can be checked whether the sound pressure for individual frequencies is below or above a frequency-dependent threshold value. Frequency-dependent threshold values are particularly provided to make it possible to check whether the test electric motor falls below or rises above appropriate threshold values.

It is particularly advantageous if the test electric motor is freely supported and, in particular, if it is not clamped. No significant resonance shift or damping is thus caused by its support so that the sound pressure can be determined with high reproducibility.

In particular, the test electric motor is supported in a vibration-damping way so that the influence of the surroundings on the vibrational excitation of the electric motor can be kept at a low level.

Further, in accordance with the invention, a device to measure the noise level of an electric motor is provided by means of which the noise level can be determined in a simple and reproducible way.

In accordance with the invention, a supporting device is provided for the test electric motor in which the test electric motor can be freely supported, a laser vibrometer device is provided by means of which a vibrational excitation of the test electric motor can be determined, and an evaluation device is provided by means of which this vibrational excitation can be correlated to a noise level.

The device according to the invention is suitable for carrying out the method according to the invention. The advantages of such a device have already been outlined in relation to the method according to the invention.

Other beneficial embodiments have also been outlined in relation to the method according to the invention.

The supporting device is particularly formed in such a way that the test electric motor can be supported in a vibration-damping way. This allows the influence of the surroundings as it affects the resonance behavior of the test electric motors to be kept low.

Provision can be made for the supporting device to comprise one or more damping elements onto which the test electric motor can be placed, i.e. on which it can be supported. In this way the electric motor can be vibrationally dampened with respect to its surroundings.

The laser vibrometer device can take the form of a scanning device allowing a surface of the electric motor to be scanned in order to determine the vibrational excitation at various locations.

A holding device can be provided in addition or as an alternative, on which the laser vibrometer device can be movably held. When one or a few defined measuring points have been determined, which show high correlation between vibrational excitation and sound pressure, then it is basically sufficient if the vibrational excitation for a test electric motor is determined only at this measuring point or at these few measuring points. There is then no need for the laser vibrometer device to scan the electric motor. Thus, when the measuring point or measuring points is/are known, a single-point laser vibrometer device is sufficient to determine the noise level. It is then only necessary to ensure that the laser beam produced by the laser vibrometer device is applied to the defined measuring point. Provision can be made for the laser vibrometer device and the supporting device for the test electric motor to move in relation to each other so that the application of the laser beam can be adjusted.

The following description of preferred embodiments in conjunction with the drawings serves to explain the invention in more detail.

DETAILED DESCRIPTION OF THE INVENTION

Figure 1:
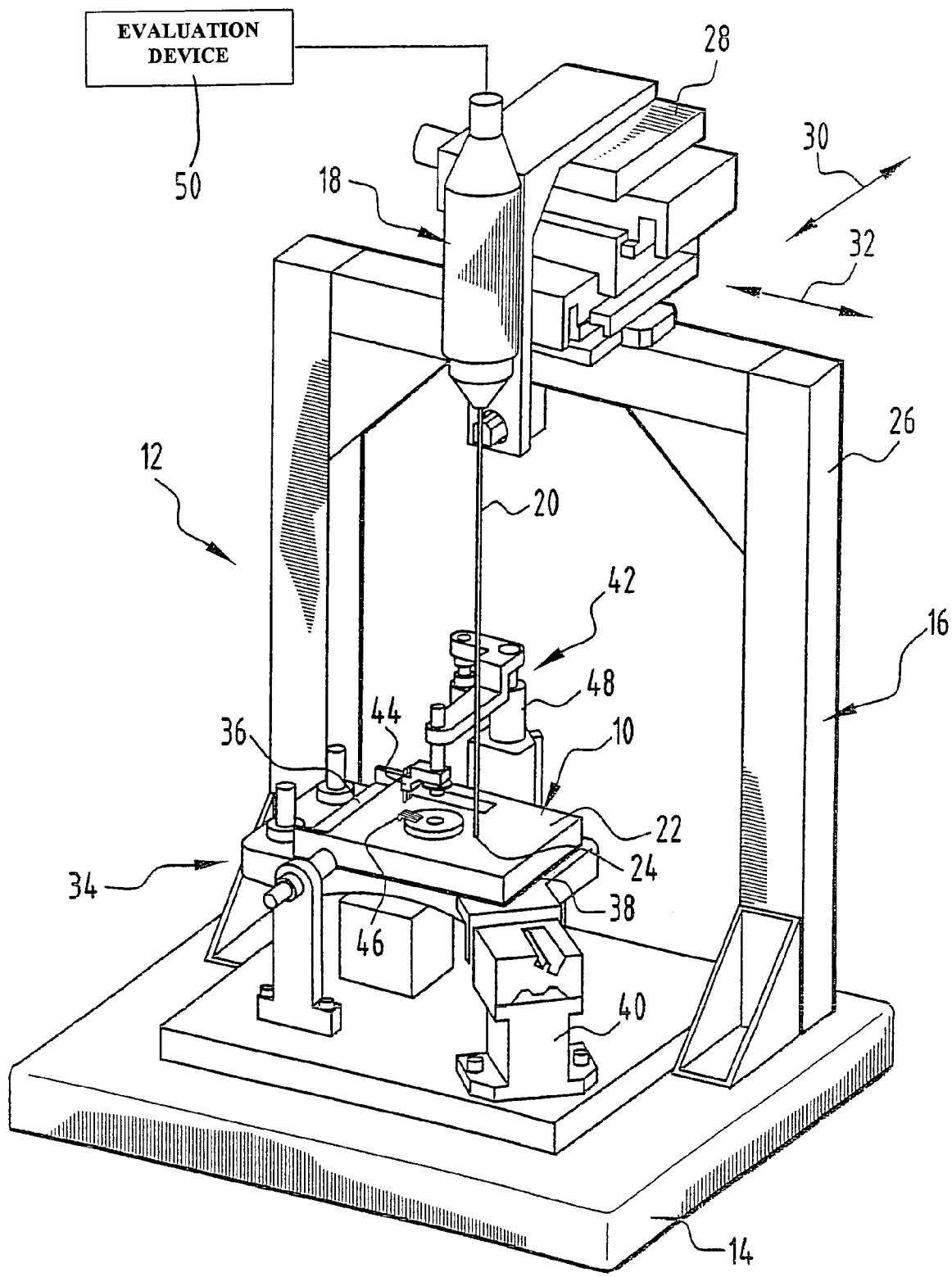
FIG. 1 a schematic perspective view of an embodiment of a measuring device to determine the noise emission of an electric motor.

An embodiment of a measuring device according to the invention to determine the noise emission of a test electric motor 10, indicated in FIG. 1 by 12, comprises a baseplate 14 on which a holding device 16 for a laser vibrometer device 18 is arranged. The laser vibrometer device 18 emits a laser beam 20 onto a surface 22 of the test electric motor 10. The back-reflected laser beam is registered by the laser vibrometer device 18.

Vibrational excitation of the electric motor 10 can be quantitatively measured using the laser vibrometer device 18; the measurement principle is based on the Doppler effect. Laser vibrometer devices are thus also referred to as laser Doppler vibrometer devices. The vibration frequency spectrum of the test electric motor 10 can be determined by the laser vibrometer device 18 at a scanned measuring point 24.

The laser beam 20 which is applied to the test electric motor 10 has a typical beam width in the order of magnitude of 20 μm.

A laser vibrometer device for measuring vibrations is described, for example, in DE 195 22 272 A1.

In the embodiment illustrated in FIG. 1, the holding device 16 includes a holding frame 26, extending above the baseplate 14 in a vertical direction. A slide 28 carrying the laser vibrometer device 18 is seated on the holding frame 26. This slide 28 is preferably formed to be moveable, having a direction of movement 30 parallel to the plane of the baseplate 14 and a direction of movement 32 transversal to this which is also parallel to the plane of the baseplate 14.

By positioning the slide 28 in the directions of movement 30 and 32, the laser beam 20 can be aimed at a defined measuring point 24 on the test electric motor 10. It can be basically provided that the laser vibrometer device 18 is a laser scanning vibrometer device by means of which a surface region can be scanned in a scanning process. In the method according to the invention, a single-point laser can also be used as an alternative, as explained in more detail below, the single-point laser vibrometer device being constructed and arranged in such a way that when the slide 28 is firmly fixed, the laser beam 20 that is emitted is aimed at a measuring point 24 on the test electric motor 10 that is fixed with respect to the baseplate 14.

A supporting device indicated in its entirety by 34 is provided for the test electric motor 10 by means of which the test electric motor 10 can be supported in a defined position with respect to the baseplate 14 and the holding device 16 and thus also with respect to the laser vibrometer device 18. This supporting device 34 comprises a receiving portion 36 into which the test electric motor 10 can be placed without needing to be clamped. The supporting device 34, together with the receiving portion 36, is formed in such a way that the influence of the supporting system on the vibrational excitation of the electric motor 10 is minimized. In particular, the test electric motor 10 is set on a damping element 38 which can be made from a rubber material for example. This damping element 38 vibrationally dampens the test electric motor 10 with respect to the supporting device 34 and thus with respect to the measuring device 12.

It can be provided that the receiving portion 36 itself is seated on supports 40 ensuring improved vibrational damping.

A contacting device 42 is provided for the electrical contact of the electric motor 10, this contacting device 42 having an electrical connecting element 44. The electrical connecting element 44 is adapted to an appropriate connecting element 46 of the test electric motor 10.

The contacting device 42 is formed in such a way that the electrical connecting element 44 can be coupled to the electric motor 10 from above or from below with minimum contact to the surface 22 of the electric motor 10. In the embodiment of a measuring device 12 according to the invention illustrated in FIG. 1, the contacting device 42 comprises a lifting/rotary unit 48 which holds the electrical connecting element 44 with the appropriate connecting leads. This lifting/rotary unit can be rotated around an axis and is movable along this axis. This allows the electrical connecting element 44 to be set on the connecting element 46 of the test electric motor 10 from above.

The vibrational excitation is determined by the measuring device 10 at one or a few defined measuring points 24 using a laser Doppler measurement. According to the invention, this vibrational excitation is correlated with the noise emission of the test electric motor 10. Correlation is effected using an evaluation device 50. In order to carry out such measurement and correlation, some work has to be performed in advance to determine the measuring point 24 or the few measuring points 24 and to determine the correlation parameters.

The following procedure can be taken:

A series of identically constructed electric motors whose noise emission is known is selected. Their noise level (sound pressure) is measured in a sound chamber, for example. The number of electric motors is chosen in such a way that statistically relevant results can be derived from it. For example, 50 electric motors can be chosen.

A subset representing the actual test series is then chosen from this number of test motors, the noise level for these electric motors lying within a specific noise level range. This defined noise level range is preferably statistically defined via the standard deviation from a medium noise level. For example, electric motors are chosen whose noise level lies in a range of four times the standard deviation (four sigma range). To determine the correlation lines in accordance with FIG. 3, 20 electric motors were chosen.

Figure 2:
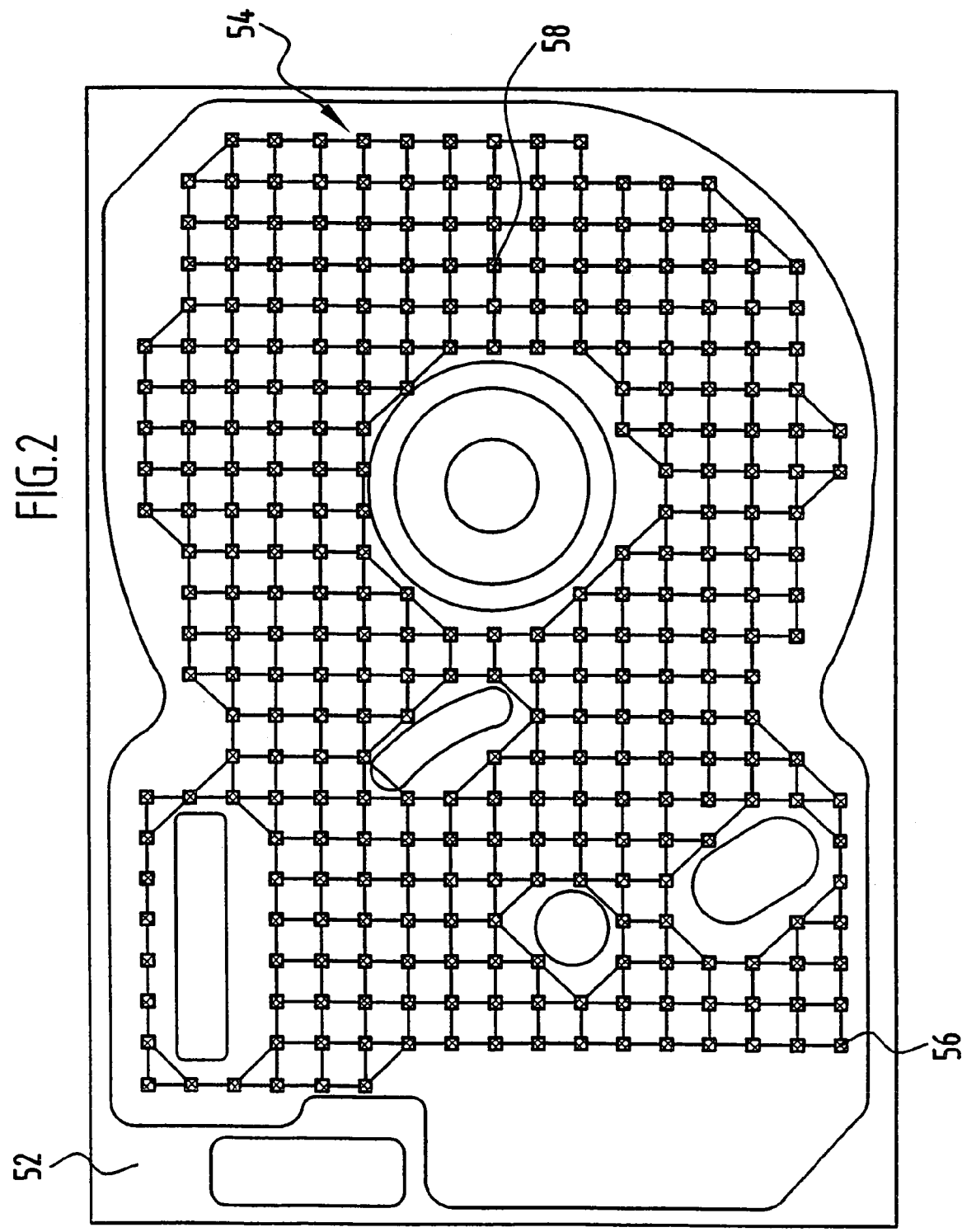
FIG. 2 a view from above of a test electric motor, on which a grid is superimposed in order to determine a measuring point.

This series of selected electric motors is now measured using the measuring device 12. The respective electric motors 52 are measured, as schematically shown in FIG. 2, with the aid of a (virtual) grid 54 which is scanned, for example, by a scanning laser vibrometer device 18. While the electric motor 52 is running, operating at its nominal speed in particular, the respective vibrational excitation is determined at grid points 56 using the laser vibrometer device.

Measuring points 24 are then determined at which there is a relatively high vibration amplitude, i.e. vibration antinodes are sought at which an absolute or at least a relative maximum of the vibration amplitude is formed.

These measurements are carried out for the selected series of electric motors 52. A measuring point 24 or a few measuring points 24, at which there is a (relatively) large vibration amplitude, is/are then determined for the total number of electric motors. This measuring point 24 or the few measuring points 24 is/are then used to determine the noise emission for the test electric motor 10.

For example, there is a well-formed vibration antinode at grid point 58 in accordance with FIG. 2. This then defines the measuring point 24 for the test electric motors 10.

The supporting device 34 and the laser vibrometer device 18 are accordingly positioned with respect to each other in such a way that the laser beam 20 is aimed at the defined measuring point 24 when the test electric motor 10 is accommodated in the receiving portion 36.

While it is advantageous to scan the surface of the identically constructed electric motors 52 to determine the grid point 58 thus making a scanning laser vibrometer advantageous, once such a measuring point 24 or the few measuring points 24 has/have been found, it is sufficient to use a single-point laser vibrometer device 18. For example, a separate device can be provided to determine the measuring point 24 or the measuring points 24, and a single-point laser vibrometer device 18 is used to determine the noise emission of the test electric motor 10, or the laser vibrometer device 18 can have a scanning function which, after the measuring point 24 or the measuring points 24 has/have been determined, is turned off when the noise emission of the test electric motors 10 is being determined.

Figure 3:
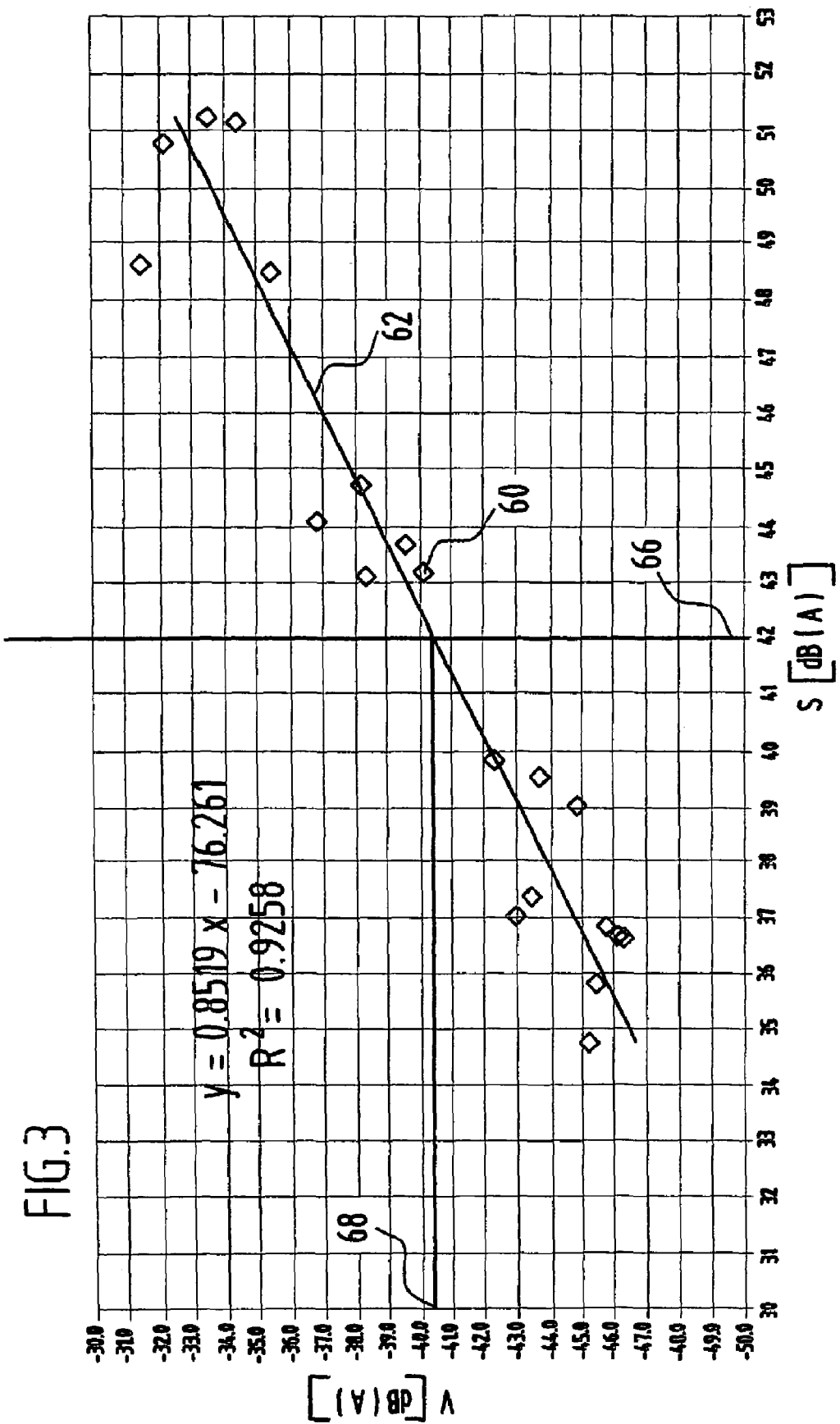
FIG. 3 a comparison of the vibration amplitude at a defined measuring point with the sound pressure for a series of identically constructed electric motors and a correlation line (regression line) and its equation and FIG. 4 a frequency spectrum at a defined measuring point for a series of electric motors.

The vibrational excitation at the measuring point 24 (corresponding to grid point 58) is correlated, as schematically shown in FIG. 3, for the series of electric motors 52 having a known noise level. In FIG. 3, the vibration amplitude, which has been determined by the laser vibrometer device 18 at measuring point 24 for each of the electric motors 52, is plotted on the Y axis in dB(A). The sound pressure, which is known for the electric motors 52, is plotted on the X axis in dB(A). Each of the measuring points 60 corresponds to an electric motor 52.

A correlation line 62 (regression line) is determined for the measuring points 60 which has the equation y=0.8519x−76.261 with a correlation coefficient $R^2$ of 0.9258.

Through the determination of the correlation lines, the correlation parameters (that is to say the gradient and intercept of these straight lines) are determined; these parameters can in turn be used by the evaluation device 50 in order to determine—without contact—the noise level from the vibration amplitude measured by the laser vibrometer device.

Provision can basically be made for the correlation line for each grid point 56 of the series of electric motors 52 to be determined; 300 grid points are provided by way of example. The correlation coefficient $R^2$ is then determined for each grid point for this series of electric motors 52. The identified measuring point 24 (or a number of several measuring points 24), at which the vibrational excitation best correlates with the noise level, is preferably found where the correlation coefficient $R^2$ is the largest, i.e. lies the closest to one.

It has been proven in practice that in order to obtain good correlation it is usually sufficient to find a vibration antinode.

To determine the amplitude of the vibrational excitation, the frequency spectrum is determined, using fast Fourier transformation for example. To determine the measuring point 24 or the measuring points 24, an octave analysis is preferably provided, with the third octave being used for example. This means that low-frequency influences such as imbalance and switching noise do not exert any influence on the determination of the measuring point 24 or the few measuring points 24.

For a specific type of electric motor, the measuring point 24 or the few measuring points 24 is/are known after the correlation has been determined for a series of electric motors 52. Moreover, the correlation parameters are known so that according to the invention, for an identically constructed test electric motor 10, the vibration amplitudes measured using the laser vibrometer device 18 can be correlated with the noise level (sound pressure) at a measuring point 24. This means that the noise emission of a test electric motor 10 can be determined without contact, a result being also quickly obtainable due to the single measuring point 24 or the few measuring points 24. This in turn allows a large number of electric motors 10 (with the same construction) to be tested simply, quickly and reproducibly.

Figure 4:
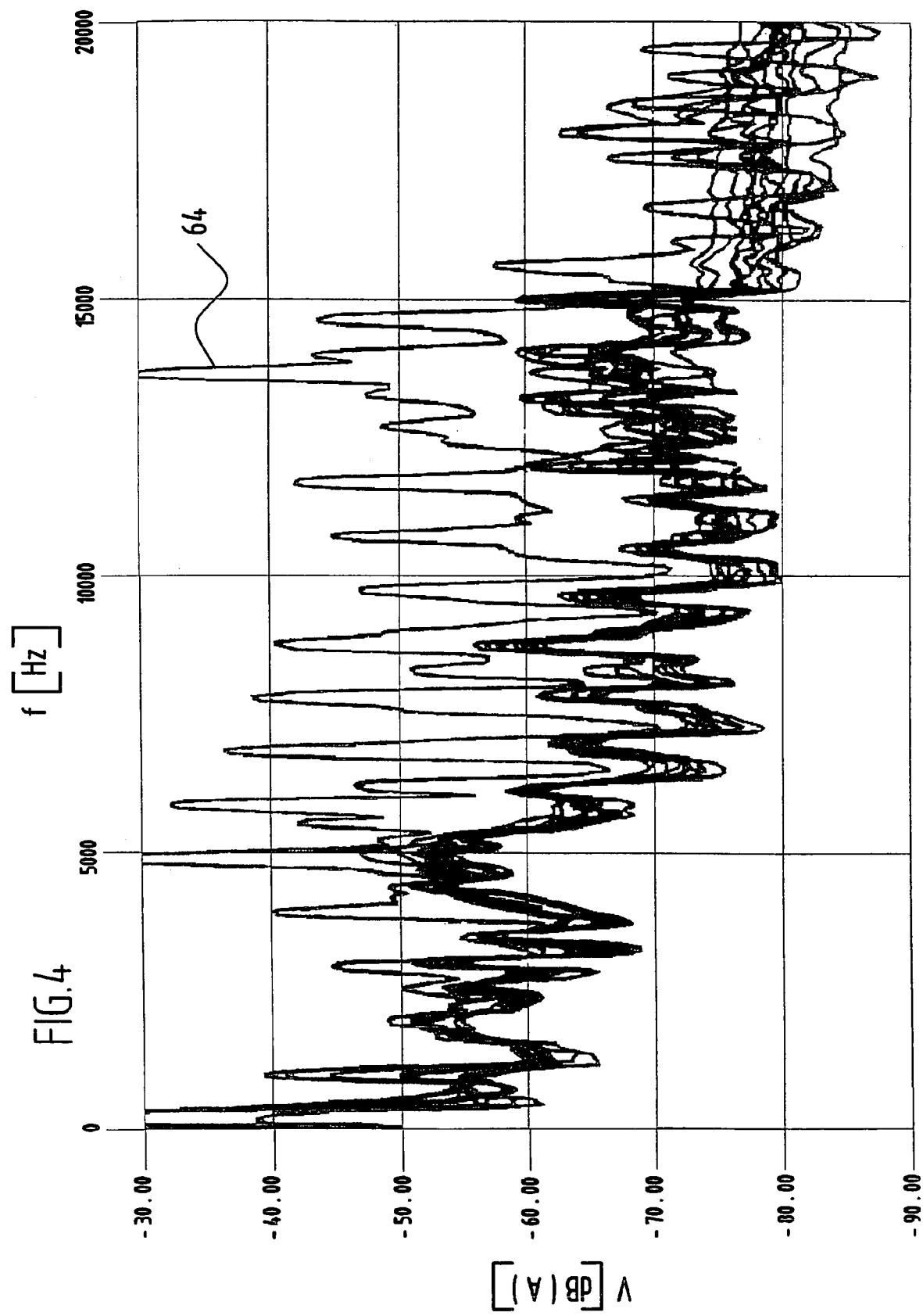

FIG. 4 shows frequency spectra for various electric motors which are produced as a result of the measurement at the defined measuring point 24. The frequency spectra are determined from measurement data by means of fast Fourier transformation.

It can be seen that frequency spectrum 64 deviates strongly from the other frequency spectra. The electric motor with frequency spectrum 64 has too high a level of noise emission.

In FIG. 4, spectra can also be identified that have a distinct amplitude at low frequencies and in particular at zero frequency. This can be attributed to the imbalance of the respective electric motor. This spectrum component is filtered out in determining the sound pressure.

At a frequency of approx. 5000 Hz (as well as integral multiples thereof), changes in the frequency spectrum for a large number of electric motors can be identified. This can be attributed to switching noise.

It is possible to derive criteria from the measured frequency spectrum as to whether an electric motor meets a given specification or not. Here, it should be noted that the frequencies are acoustic frequencies. When the noise is being determined, the electric motor itself operates at its nominal speed.

For example, electric motors can be given the specification that the sound pressure is to be less than 42 dB(A). A corresponding cut-off level 66 is drawn in FIG. 3. As a result, this in turn produces a threshold value 68 for the vibration amplitude at the measuring point 24.

Using the cut-off level 66, it is possible to determine a threshold value or a threshold value range for each individual frequency for the electric motors which meet the specification. In the same way, it is possible to determine a (minimum) threshold value curve for each individual frequency of the electric motors which do not meet the noise specification.

By these means, a threshold value range can again be determined for each individual frequency making it possible to determine in a simple, frequency-resolved way whether an electric motor meets or does not meet the required specifications.

In the method according to the invention, the vibration amplitude is measured by the laser vibrometer device 18 at the determined measuring point 24 of the test electric motor 10 and the noise level is calculated using correlation parameters that have been previously determined on identically constructed electric motors. This enables not only the overall noise level to be determined, but also the noise level for the individual frequency components (prominent tone).

In accordance with the invention, this allows the noise level to be determined without contact but with high reproducibility and high precision. The resonance characteristics of the test electric motor 10 are only slightly influenced by the measurement.

| LIST OF REFERENCE NUMERALS | |
|---|---|
| 10 | Electric motor |
| 12 | Measuring device |
| 14 | Baseplate |
| 16 | Holding device |
| 18 | Laser vibrometer device |
| 20 | Laser beam |
| 22 | Surface |
| 24 | Measuring point |
| 26 | Holding frame |
| 28 | Slide |
| 30 | Direction of movement |
| 32 | Direction of movement |
| 34 | Supporting device |
| 36 | Receiving portion |
| 38 | Damping element |
| 40 | Supports |
| 42 | Contacting device |
| 44 | Electrical connecting element |
| 46 | Electrical connecting element |
| 48 | Lifting/rotary unit |
| 50 | Evaluation device |
| 52 | Electric motor |
| 54 | Grid |
| 56 | Grid point |
| 58 | Grid point |
| 60 | Measuring point |
| 62 | Correlation line |
| 64 | Frequency spectrum |
| 66 | Cut-off limit |
| 68 | Threshold value |

The invention claimed is:

1. Measuring method to determine the noise emission of an electric motor, comprising:
    measuring a vibrational excitation of a running test electric motor by a laser vibrometer device at one or more defined measuring points on the test electric motor; and
    correlating the measured vibrational excitation with a noise level, wherein:
        the test electric motor or one or more identically constructed electric motors are scanned in order to determine the one or more defined measuring points; and
        a surface of the electric motor(s) is divided into a grid and the vibrational excitation is determined by the laser vibrometer device at said one or more defined measuring points corresponding to grid sites on said grid.

2. Measuring method according to claim 1, wherein the vibrational excitation is measured at the test electric motor's nominal speed.

3. Measuring method according to claim 1, wherein the vibrational excitation is measured at said one or more defined measuring points on the test electric motor at which a vibration antinode is formed.

4. Measuring method according to claim 1, wherein the one or more defined measuring points are determined such that there is a high correlation to the noise level.

5. Measuring method according to claim 1, wherein the one or more defined measuring points are determined in the course of an octave analysis of the vibrational excitation.

6. Measuring method according to claim 1, wherein in order to determine correlation parameters between the vibrational excitation and the noise level, the vibrational excitation for a series of said identically constructed electric motors having a known noise level is determined.

7. Measuring method according to claim 6, wherein the identically constructed electric motors are chosen in such a way that their noise level lies within a specific noise level range.

8. Measuring method according to claim 7, wherein the determined noise level range comprises a range of at least twice a standard deviation.

9. Measuring method according to claim 6, wherein the one or more defined measuring points are determined to determine the vibrational excitation for the series of said identically constructed electric motors.

10. Measuring method according to claim 1, wherein a frequency spectrum of the vibrational excitation is determined.

11. Measuring method according to claim 10, wherein the frequency spectrum is determined up to at least 20 kHz.

12. Measuring method according to claim 10, wherein for each frequency, a threshold value or a threshold value range for a vibration amplitude is specified.

13. Measuring method according to claim 1, wherein the test electric motor is freely supported.

14. Measuring method according to claim 13, wherein the test electric motor is supported in a vibration-damping way.

15. Device to measure the noise level of an electric motor, comprising:
    a supporting device for a test electric motor in which the test electric motor is freely supportable;
    a laser vibrometer device in the form of a scanning device by means of which a vibrational excitation of the test electric motor is determinable; and
    an evaluation device by means of which the vibrational excitation is correlatable to a noise level.

16. Device according to claim 15, wherein the test electric motor is supported by the supporting device in a vibration-damping way.

17. Device according to claim 16, wherein the supporting device comprises one or more damping elements onto which the test electric motor is placeable.

18. Device according to claim 15, wherein a holding device is provided on which the laser vibrometer device is movably held.

* * * * *